Jan. 2, 1973   J. R. BIRK ET AL   3,708,270

PYROLYSIS METHOD

Filed Oct. 1, 1970   2 Sheets-Sheet 1

INVENTORS.
JAMES R. BIRK
DONALD A. HUBER

BY *Robert M. Davidson*

ATTORNEY 3,708,270
PYROLYSIS METHOD
James R. Birk, Thousand Oaks, and Donald A. Huber, Canoga Park, Calif., assignors to North American Rockwell Corporation
Filed Oct. 1, 1970, Ser. No. 77,225
Int. Cl. C01b 1/00, 49/00; C10j 3/06
U.S. Cl. 48—202
7 Claims

ABSTRACT OF THE DISCLOSURE

A method of pyrolyzing carbonaceous materials including industrial, municipal and agricultural wastes is disclosed. The carbonaceous material is pyrolyzed by contact with a molten alkali metal salt which contains sulfide and/or sulfate ions. The products of the reaction are a pyrolysis gas and char. Char is consumed in converting the sulfate to sulfide. A reactive source of oxygen is introduced into the melt converting sulfide back to sulfate and liberating heat to the melt to sustain the operation.

CROSS-REFERENCE TO RELATED APPLICATIONS

A method for producing heat by reacting a molten sulfide with a reactive form of oxygen and then reducing the sulfate formed back to the sulfide with a carbonaceous material is described in copending patent application Ser. No. 77,219 by J. Birk filed Oct. 1, 1970 and commonly assigned with the present invention.

A method for converting hydrocarbons into more valuable products by contacting said hydrocarbons with a sulfide containing alkali metal melt with subsequent treatment of the melt to add heat and recycle of hot melt is described in copending patent application Ser. No. 77,170 by L. A. Heredy et al. filed Oct. 1, 1970 and commonly assigned with the present application.

BACKGROUND OF THE INVENTION

(A) Field of the invention

This invention relates to the field of pyrolysis. More particularly, it relates to a cyclic process for the pyrolysis of carbonaceous materials wherein said carbonaceous materials are heated by contact with a hot molten salt thereby forming pyrolysis products. Still further, it relates to a carbonaceous pyrolysis process wherein the pyrolysis occurs with a molten salt which is then heated by an internal chemical reaction.

(B) Description of the prior art

The pyrolysis of carbonaceous materials by heating in the absence of oxygen to obtain valuable products is a well-known process. The products derived depend upon the carbonaceous material and the pyrolyzing conditions. The conventional method of pyrolyzing involves placing the material in a retort and then heating the outer surface of the retort. Both batch and continuous processes have been carried out in this manner. In some instances, a portion of the carbonaceous material or pyrolysis products is externally combusted to provide heat for the remaining portion. Many forms of carbonaceous substances have been used as a feed for pyrolysis processes. Where byproduct recovery has been the primary concern, conventional sources such as coal, wood, oil, and lignite have been used. More recently, pyrolysis has been considered as a solid waste treatment process. Used for either purpose, (i.e., by-product recovery or disposal), conventional prior art pyrolysis processes have several disadvantages. A primary disadvantage is the use of an extenal open flame heat source. Reliance on such a heat source results in a poor heat transfer to the material to be pyrolyzed. It has been found that if the carbonaceous feed can be rapidly heated to pyrolysis temperatures, greater yields of useful gaseous by-products are achived. In addition, throughput is much higher if rapid pyrolysis can be achieved. Another major disadvantage of prior processes is their tendency to emit air pollutants. The source is two-fold; the open flame used for heating the pyrolysis vessel and the pyrolysis gases themselves. In view of those problems associated with known methods of pyrolysis, it is clear that an improved method of pyrolyzing materials is needed.

In contrast to the pyrolysis art, the art of molten salt chemistry has seen significant improvements in recent years. U.S. Pat. No. 3,438,722 to L. A. Heredy et al. is an example. The patent describes the absorption of sulfur oxides from flue gases in a molten alkali melt. In addition, a method of gasifying carbonaceous materials in a molten salt environment has been disclosed. Thus, in U.S. Pat. No. 3,252,773 to Solomon et al., a carbonaceous solid material and steam are brought into contact with a melt comprising an alkali metal compound under conditions such that a hydrogen-rich gas is formed. Heat for this reaction may be supplied by combusting carbon by the conventional reaction $C + O_2 \rightarrow CO_2$.

SUMMARY OF THE INVENTION

We have now discovered an improved method of pyrolyzing carbonaceous materials. In this improved process the carbonaceous materials are brought into contact with a hot sulfate- or sulfide-containing melt at pyrolysis temperatures and under non-oxidizing conditions. Char and valuable effluent gases are obtained. The char is consumed (oxidized) by reaction with sulfate; the sulfide that is formed is converted back to sulfate by reaction with oxygen (air) and the temperature of the melt is substantially increased.

Accordingly, the objects of the present invention are:

to provide an improved pyrolysis process;
to provide an improved process for the pyrolysis of carbonaceous materials;
to provide an improved cyclic process for the pyrolysis of carbonaceous materials;
to provide an improved process for the pyrolysis of coal, wood and carbonaceous wastes;
to provide an improved process for the disposal of carbonaceous wastes, and
to provide an improved method for obtaining valuable products from carbonaceous materials.

These and other objects and advantages of the invention will become more apparent upon consideration of the following detailed description of the preferred embodiments of the invention in which reference is made to the figures of the attached drawings.

DETAILED DESCRIPTION OF THE PREFERRED EMBODIMENTS

The present invention is broadly directed to the pyrolysis of carbonaceous materials for the production of valuable gaseous and liquid products or for the production of coke or for the disposal of solid wastes. A wide variety of carbonaceous materials may be treated according to this invention including wood, peat, lignite, coal, oil and various municipal, agricultural, and industrial wastes. The carbonaceous material is rapidly pyrolyzed by contact with a molten salt, preferably an alkali metal salt or mixtures of alkali metal salts.

Figure 1:
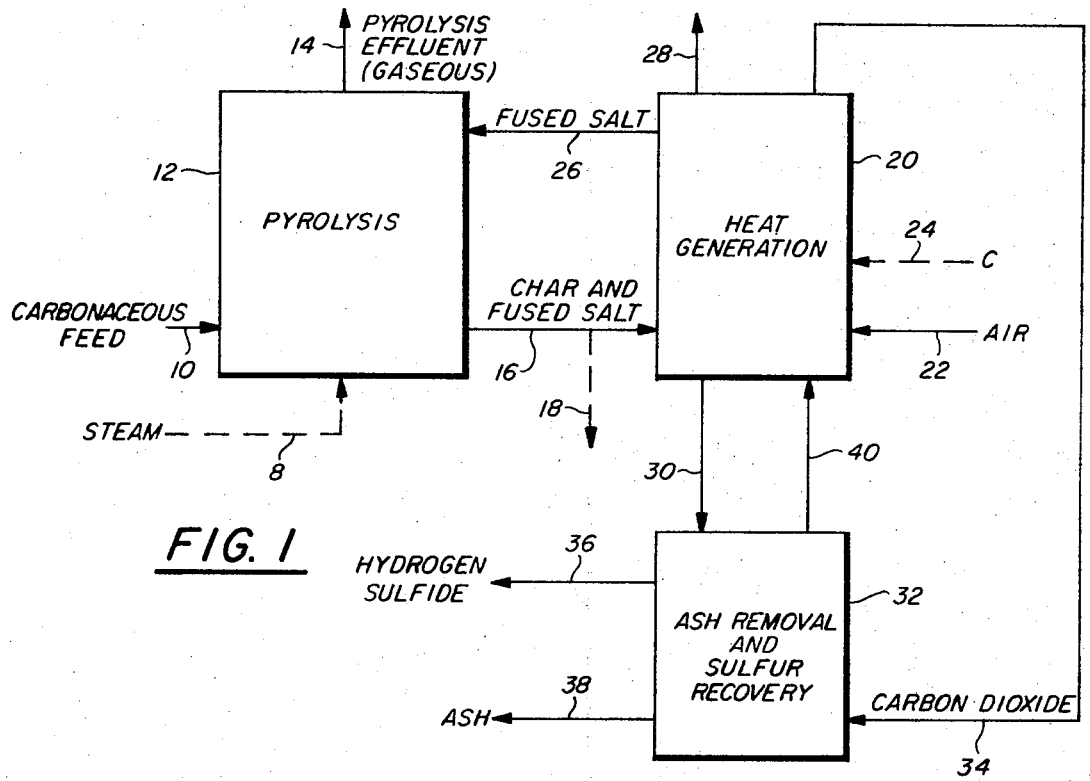
FIG. 1 is a schematic illustration of a flow plan representing the major steps of the invention.

The flow-scheme illustrated in FIG. 1 is illustrative of the general process. Depending upon the nature of the carbonaceous feed it may undergo a pretreatment operation comprising a grinding or crushing or an operation wherein a portion of the non-carbonaceous constituents is removed. This pretreatment will be particularly applicable where this feed material is a non-homogeneous waste. The carbonaceous feed 10 is fed to a pyrolysis vessel 12 wherein it is brought into contact with a hot alkali metal molten salt. The temperature of operation will vary from about 400 to 1300° C. and preferably in the range of from about 700 to 900° C. The melt will consist of from about 1 to 25 weight percent sulfur which will be present as sulfide or sulfate. The remainder of the melt may consist of other alkali metal salts which are compatible with the sulfides and sulfates at operating temperatures. A preferred class of salts is the alkali metal carbonates including mixtures of alkali metal carbonates. For purposes of illustration the constituents of the melt will be alternatively considered either as compounds per se or as their component ions.

As a result of the contact with the hot melt the carbonaceous feed will by pyrolyzed into gaseous constituents such as $CH_4$, $H_2$, $C_2H_4$, $C_2H_6$, $CO$ and $CO_2$ as well as water vapor and condensable organic gases. These products are shown leaving the vessel 12 as effluent 14. The effluent is a source of valuable gaseous and liquid components or fuel. Coincident to the product of gases, a char is also formed in the pyrolysis reactions. Depending upon the nature of the carbonaceous feed this char may be recovered as a saleable product. For example, if the carbonaceous feed 10 consists of coal it will be rapidly converted to gases and a valuable coke. A stream of coke and molten salt 16 is continuously withdrawn from the vessel 12. A portion of the coke may be separated from the molten salt by filtration or other conventional means and collected as a separate product 18.

Alternatively, an optional steam input 8 could provide a source of steam for gasification of the char material according to the reaction $$H_2O + C \rightarrow CO + H_2$$

Thus, more of the carbonaceous material could be converted to valuable gaseous products.

Char and molten salt mixture 16 from vessel 12 are fed to a heating vessel 20 where the remaining char is consumed in one of two cyclic reactions which together produce sufficient heat to supply the needs of the pyrolysis. Vessels 12 and 20 may represent zones of a single reactor.

The reactions which take place in the heating vessel are represented by the following equations.

(1)  $M_2S + 2O_2 \rightarrow M_2SO_4$ (2)  $M_2SO_4 + 2C \rightarrow M_2S + 2CO_2 \uparrow$ where M=Na, Li, K or mixtures thereof.

Reaction 1 is very exothermic whereas Reaction 2 is endothermic. The composite of Reactions 1 and 2 results in the liberation of an amount of heat equivalent to that given off in the overall reaction:

$$C + O_2 \rightarrow CO_2$$

A source of oxygen such as air input 22 is provided to the vessel 20. Also, if necessary, a source of carbon 24 is provided. The heat generated in reactor 20 is imparted to the molten salt mixture which is transferred back to vessel 12. These heat generation reactions will be carried out at above 600° C. and preferably from about 800° C. to about 1300° C. Normally, the temperature of the heat generation zone will be maintained at least 50–100° C. above the temperature of the pyrolysis zone. Reaction products 28 principally $CO_2$ and $N_2$ (if air is the source of oxygen) are expelled from reactor 20.

In addition to a carbonaceous reductant and a reactive form of oxygen, it may sometimes be desirable to include a catalyst for the reduction reaction. Iron has been found to be a good catalyst for this reaction. Thus, an amount of iron ranging from about 0.5 to about 7 weight percent of the melt may be used. The iron may be added in the elemental form or in the form of compounds containing iron which are compatible with the other melt constituents such as iron sulfide or iron sulfate.

Figure 2:
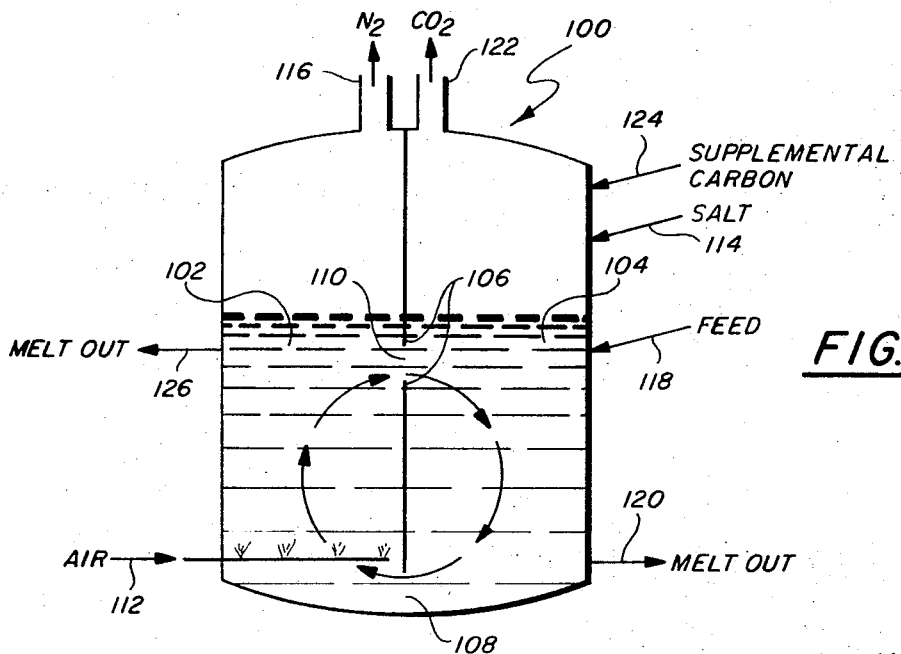
FIG. 2 is a schematic illustration of a preferred form of reactor for reheating the melt.

FIG. 2 illustrates a preferred form of reactor for supplying heat to the melt. There, 100 represents a reactor vessel consisting of a sulfide oxidation zone 102 and a sulfate reduction zone 104 preferably separated by a slotted partition 106. Partition 106 is constructed with two major openings 108 and 110 which provide fluid communication between zones 102 and 104. The sulfide oxidation zone 102 has associated therewith an air inlet and distributor system 112, melt outlet 126, and gaseous outlet 116. The sulfate reduction zone 104 has associated therewith a melt-char inlet 118, a supplemental carbon inlet 124, a melt outlet 120, a gaseous outlet 122, and a purified salt return 114.

In operation, the reactor is filled with melt to a point higher than opening 110 in partition 106. Air is supplied to oxidation zone 102 through distributor system 112, causing sulfide salts to be oxidized to sulfate salts according to Reaction 1. The introduction of air also causes an upwardly-directed flow of melt in zone 102. Nitrogen from the introduced air leaves the oxidation zone 102 of the reactor via line 116. Circular flow patterns developed in the melt cause oxidized salts to flow through opening 110 to zone 104. Here the inlet 118 which contains char (i.e., line 16 in FIG. 1) and supplemental carbon 124 if necessary, is added to reactor 100 and the sulfate is reduced to sulfide by the char according to Reaction 2. Carbon dioxide produced in this reaction exits the reactor vessel at 122. Reduced melt from zone 104 is carried by established flow currents through opening 108 of partition 106 to zone 102. Heated melt is drawn off at 120 or 126 for return to the pyrolysis zone. A portion of melt 120 may be withdrawn for purposes of removing accumulated impurities. Purified salt is returned to the reactor vessel at 114.

Alternatively, the partition 106 need not be present in reactor 100. In this situation Reactions 1 and 2 are carried out simultaneously. For this case it is preferable that an excess of carbon be present so that under steady state operating conditions Reaction 2 is favored and the sulfur present in the melt is substantially all in the sulfide form. Under these conditions the oxygen reacts with sulfide in preference to reacting directly with carbon. In other words, substantially all the carbon will be consumed by the mechanism of Reaction 2.

Returning now to FIG. 1, a portion 30 of melt from reactor 20 is withdrawn to an impurity removal zone 32. The amount and type of impurities present in the melt will vary depending upon the source of carbonaceous feed 10. The most common impurities are ash and sulfur. To remove these impurities, molten salt 30 is quenched in water, the ash filtered out, and the remaining solution is contacted with carbon dioxide whereby salts which may have been in the sulfide form are converted to the bicarbonate form and hydrogen sulfide is evolved. Then, the bicarbonate slurry is filtered and the solution recycled to the quenching operation. The solid bicarbonate is returned to the heating reactor. The bicarbonate decomposes to carbonate upon heating. For purposes of illustration this impurity removal portion of the process has been illustrated at 32 as having a molten salt input 30, a carbon dioxide input 34, a hydrogen sulfide output 36, an ash output 38 and a salt return 40.

Figure 3:
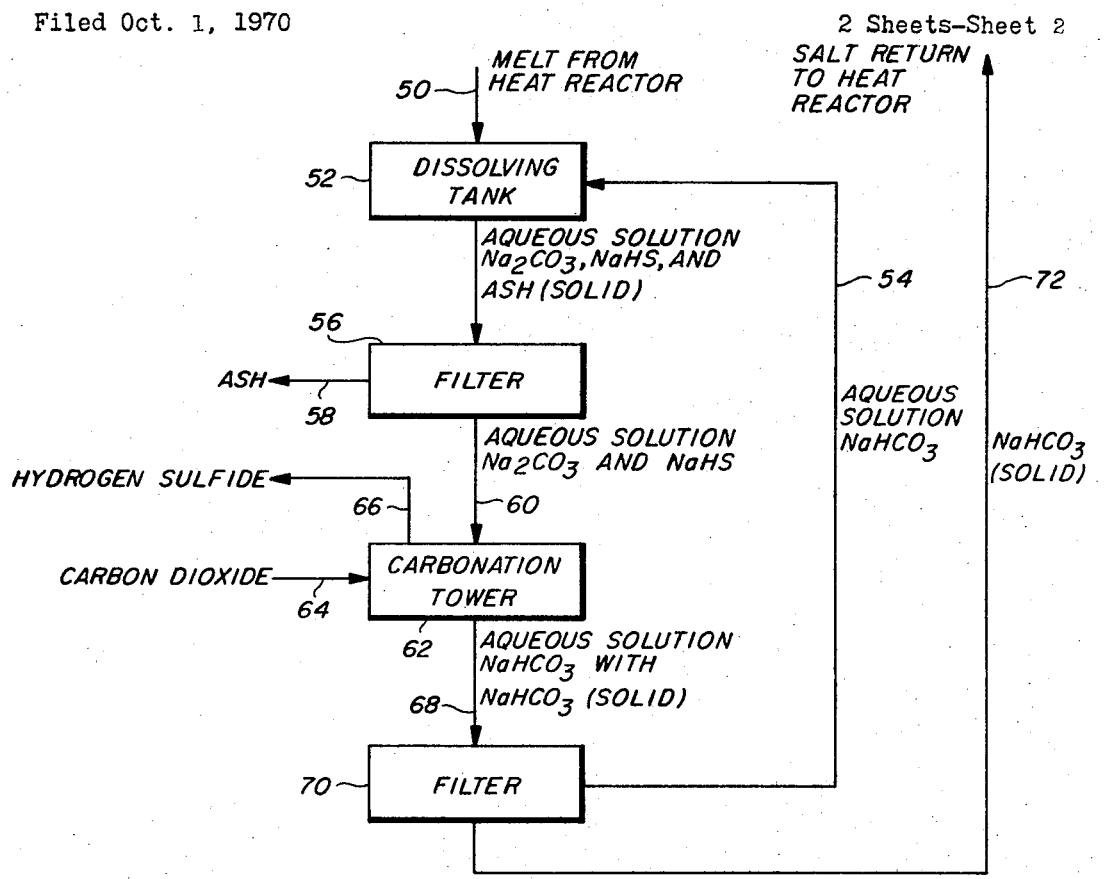
FIG. 3 is a schematic illustration of a flow diagram representing a preferred method of impurity removal.

FIG. 3 illustrates a preferred method of impurity removal. In that figure, 50 represents a stream of melt from a reactor such as 20 in FIG. 1 or 100 in FIG. 2. For purposes of illustration, the alkali metal content of this stream is represented in terms of sodium ion only. Stream 50 withdrawn from the reactor is fed to dissolving tank 52. If desired, the melt may be cooled by heat exchange prior to entering tank 52. Within the dissolving tank, the melt is brought into contact with an aqueous solution. In the preferred case shown, the melt is contacted with stream 54 which consists of a recycle aqueous solution of sodium bicarbonate. The bicarbonate of the recycle stream reacts with the sodium sulfide according to the reaction:

(3) $NaHCO_3 + Na_2S \rightarrow Na_2CO_3 + NaHS$ to produce sodium carbonate and sodium bisulfide. The resulting mixture of soluble salts and insoluble ash is fed to a filter unit 56 or to any other similar conventional separatory apparatus where the ash is separated and removed via line 58. Following removal of the insolubles, the aqueous solution is fed via line 60 to a carbonation tower 62 of conventional design wherein the solution is contacted with carbon dioxide 64 at a temperature of from 50 to 120° C. and a pressure of from about 10 to 150 p.s.i. The result of carbonation is to convert the sodium bisulfide to sodium bicarbonate according to the following reaction:

(4) $NaHS + CO_2 + H_2O \rightarrow NaHCO_3 + H_2S$

Hydrogen sulfide formed in this reaction is withdrawn via line 66 and may be supplied to a conventional plant for the production of sulfur or sulfuric acid.

A portion of the product bicarbonate is soluble and a portion is insoluble. The entire slurry is fed via line 68 to a filter unit 70 or conventional separatory unit where the soluble and insoluble portions are separated. The soluble portion is recycled via line 54 to dissolving tank 52 while the insoluble solid portion is returned via line 72 to the heat producing reactor where it decomposes to form carbonate. By constantly withdrawing and treating a portion of the melt in this manner, excessive build-up of sulfur and ash can be prevented.

As noted above, the amount of melt withdrawn for treatment and the amount of hydrogen sulfide obtained will depend upon the concentration of ash and sulfur in the carbonaceous feed. Generally, an amount of sulfur of from between 1 and 25% and preferably 2 to 10% on a weight basis should be maintained in the furnace melt. The proper amount of sulfur content will depend upon the design of the reactor. The primary limitation is that sufficient sulfur be contained in the melt such that Reactions 1 and 2 above are preferentially performed to the exclusion of the reaction $C + O_2 \rightarrow CO_2$. If the reactor is divided into two zones wherein there is little if any direct contact between the carbonaceous material and oxygen then the amount of sulfur required as a sulfide or sulfate is not as great. In the case where the design of the reactor causes intimate contact between the carbonaceous feed and the oxygen source higher sulfur concentrations in the form of sulfide are required. Ash content should be kept below about 20 weight percent in order to prevent the problems associated with increased viscosity.

Numerous advantages are obtained by conducting the pyrolysis operation in a molten salt bath in the manner contemplated by the present invention. Pyrolysis proceeds very rapidly in the molten salt environment giving rise to high gas yields and high throughput. Also, impurities are kept within the melt and an external flame is not required for heating; thereby, air pollution problems are eliminated. Char, the by-product of least value, is used to supply heat for the process. In the case of solid waste pyrolysis, the process has the advantages of pollution elimination, potential revenue from sale of by-products, elimination of requirement for large excesses of air, and applicability to a diversity of wastes including polyvinyl chloride, rubber, sewage sludge, nylon, chemicals, pesticides, as well as agricultural, municipal, and industrial wastes.

EXAMPLE I (Generation of pyrolysis gases)

A variety of solid wastes were contacted with molten salt and the volume of off-gas was determined. In each of these studies, 485 g. (11.4% $Na_2CO_3$, 26.2% $Na_2SO_4$, and 31.2% $Li_2CO_3$ and $K_2CO_3$) of salt was placed in a ceramic reaction vessel. (2″ I.D. and 15″ height.) The top of the reaction vessel was connected to a Pyrex tube which had ports for gas inlet, sample addition, and gas outlet. The vessel was placed in an electric furnace and the temperature of the salt was raised to and maintained at 850° C. Small pieces (0.3–0.6 g.) of various solid wastes were placed in a screen box and the reaction vessel was closed. The off-gas line was connected to a water trap (magnesium perchlorate) which was in turn connected to a vessel containing water. This vessel was constructed so that the incoming gas could displace the water to a graduated cylinder. The screen box containing the solid waste was immersed into the melt and the volume of water that flowed in the graduated cylinder was subsequently measured. Table I gives results of the tests.

TABLE I

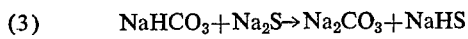

Volume of pyrolysis gas

| Waste: | Volume of gas (s.c.f./lb.) |
|---|---|
| Sun-dried weed | 12.6 |
| Sun-dried sheep manure | 11.3 / 7.8 / 6.2 |
| Paper | 11.9 |
| Wood | 9.4 |
| Rubber | 5.3 |
| Polyethylene | 4.8 |

EXAMPLE II (Generation of pyrolysis gases)

The noncondensable gaseous products from the molten salt pyrolysis of paper and dried sheep manure were determined. These tests were carried out using 300 grams of alkali eutectic carbonate at 790° C. and 0.80 gram of sample waste. Helium was used to initially purge the reaction vessel and then to carry the product from the vessel gases to a gas chromatograph for identification and determination. The results were normalized to exclude the dilution effect of helium. The data are presented in Table II.

TABLE II.—MOLTEN SALT PYROLYSIS OF WASTES

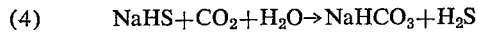

| Constituent | Volume percent of constituent | | |
|---|---|---|---|
| | Paper | Paper | Sheep manure |
| Hydrogen | 49 | 50 | 27 |
| Carbon monoxide | 28 | 22 | 24 |
| Methane | 17 | 10 | 15 |
| Carbon dioxide | 7 | 14 | 30 |

In addition, small amounts of ethane and ethylene were observed. These results show that a valuable combustible gas, rich in hydrogen is produced.

EXAMPLE III (Rate of pyrolysis)

Figure 4:
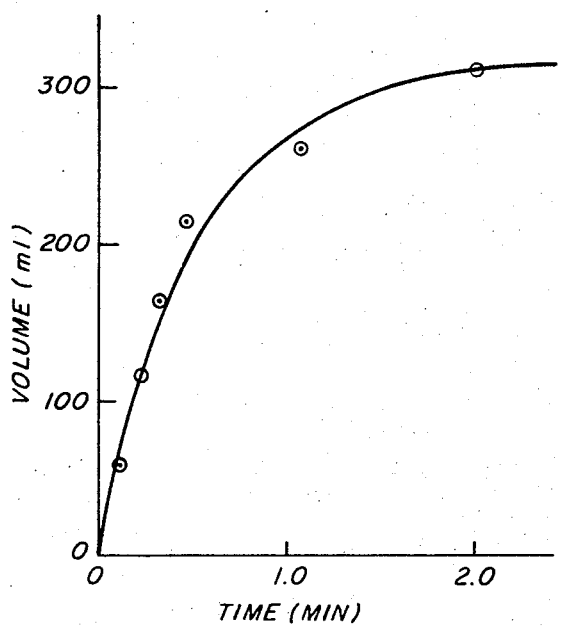
FIG. 4 is a graph illustrating the rapid rate of pyrolysis obtained in the present invention.

The rate of pyrolysis of solid wastes was measured by determining the volume of off-gas as a function of time. Tests were carried out using the apparatus and procedure described in Example I. The results of a test in where 0.58 gram of sun-dried sheep manure was pyrolyzed at 850° C. is given in FIG. 4. This figure demonstrates that nearly half of the pyrolysis occurs in only 0.33 minute and that virtually complete pyrolysis had taken place in 2.0 minutes. This was typical of a wide variety of solid wastes that were pyrolyzed in molten salts.

EXAMPLE IV
(Pyrolysis of bituminous coal)

The pyrolysis of a bituminous coal was investigated using the same apparatus and procedure described in Example I. This coal had an ash content of 10%, a water content of 19%, a sulfur content of 3.6% and a heating value of 10,000 B.t.u./lb. The results showed that 4.8 s.c.f. of gas was produced per pound of coal at 850° C. Analysis of the noncondensable gas showed that it contained approximately 45% $H_2$, 8% CO, 40% $CH_4$, 7% $CO_2$ with minor amounts of ethane and ethylene also present.

EXAMPLE V
(Pyrolysis of vacuum residual oil)

Vacuum residual oil was added to a carbonate melt and the volume (STP) of off-gas was measured as a function of temperature. This residual oil had a density of 1.0689, a yield or crude of 46.1 volume percent and 50.4 weight percent, a sulfur content of 7.71 weight percent and a Rams Bottom residue of 25.1 weight percent. These data are given in Table III.

TABLE III
Off-gas from residual pyrolysis

| Temperature (° C.): | Off-gas (mls./gram) |
|---|---|
| 450 | 60 |
| 595 | 240 |
| 825 | 550 |

Analysis of this noncondensable off-gas from the residual pyrolysis at 800° C. showed 35% $H_2$, 25% CO, 23% $CH_4$, 2% $CO_2$, 9% $C_2H_4$, and 5% $C_2H_6$.

The invention has been described herein with reference to preferred embodiments and specific examples. However, it will be apparent to those skilled in the art that many other modifications, adaptations and uses of this heat generation process are possible without departure from the spirit and scope of the invention as defined by the claims below.

We claim:
1. A closed-cycle method of pyrolytically decomposing a carbonaceous material into char and pyrolysis gases as recoverable pyrolytic decomposition products comprising the steps of
   (a) contacting said carbonaceous material in a pyrolysis reaction zone at a temperature from about 400 to 1300° C. with a melt consisting essentially of a molten alkali metal carbonate containing from about 1 to 25 wt. percent sulfur in the form of alkali metal sulfide to decompose said carbonaceous material into char and pyrolysis gases as recoverable pyrolytic decomposition products,
   (b) withdrawing from said pyrolysis reaction zone melt containing at least a portion of said char therein,
   (c) feeding said withdrawn melt from step (b) to a single-stage heat-generation zone wherein said withdrawn melt is contacted at a temperature from about 600 to about 1300° C. with a preselected amount of a reactive source of oxygen whereby said char and oxygen are consumed according to the reactions

   and
   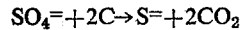

thereby heating the melt,
   (d) controlling said preselected amount of oxygen at less than that stoichiometrically required for oxidation of the char present in the melt so that under steady-state operating conditions the sulfur present in the melt is maintained substantially all in the sulfide form and substantially free of the sulfate, form, and
   (e) circulating heat-supplying melt from said heat-generation zone to said pyrolysis reaction zone, the sulfur present in said heat-supplying melt being substantially all in the sulfide form and substantially free of the sulfate form.

2. The method of claim 1 wherein a portion of said melt from said heat-generation zone is continuously withdrawn and treated to reduce the sulfur and ash content and then the so-treated melt is returned to said heat-generation zone.

3. The method of claim 1 wherein steam is also fed to said pyrolysis reaction zone to convert a portion of the char formed therein to carbon monoxide and hydrogen as recoverable gaseous products.

4. The method of claim 1 wherein from about 0.5 to 7 weight percent iron is present in the melt in the heat-generation zone.

5. A closed-cycle method of pyrolytically decomposing a carbonaceous material into char and pyrolysis gases as recoverable pyrolytic decomposition products comprising the steps of
   (a) contacting said carbonaceous material in a pyrolysis reaction zone at a temperature from about 400 to 1300° C. with a melt consisting essentially of a molten alkali metal carbonate containing from about 1 to 25 weight percent sulfur in the form of alkali metal sulfides or sulfates to decompose said carbonaceous material into char and pyrolysis gases as recoverable pyrolytic decomposition products,
   (b) withdrawing from said pyrolysis reaction zone melt containing at least a portion of said char therein,
   (c) feeding said withdrawn melt from step (b) to a first endothermic stage of a two-stage heat-generation zone consisting of first endothermic and second exothermic stages wherein a sulfate-containing melt fed from said second exothermic stage contacts said withdrawn melt in said first endothermic stage such that the char endothermically reacts with sulfate at a temperature from about 600 to 1300° C. to reduce it to sulfide in the melt and form carbon dioxide,
   (d) withdrawing sulfide-containing melt from said first endothermic stage and feeding and withdrawn melt to the second exothermic stage of the heat-generation zone wherein said withdrawn melt is contacted with a reactive source of oxygen such that the sulfide exothermically reacts with the oxygen at a temperature from about 600 to 1300° C. to re-form sulfate,
   (e) recirculating sulfate-containing melt from the second exothermic stage to the first endothermic stage of the two-stage heat-generation zone which supplies heat from the reaction occurring in step (d) to the reaction occurring in step (c), and
   (f) circulating heat-supplying melt from said heat-generation zone to said pyrolysis reaction zone.

6. The method of claim 5 wherein a portion of said melt from said heat-generation zone is continuously withdrawn and treated to reduce the sulfur and ash content and then the so-treated melt is returned to said heat-generation zone.

7. The method of claim 5 wherein steam is also fed to said pyrolysis reaction zone to convert a portion of the char formed therein to carbon monoxide and hydrogen as recoverable gaseous products.

References Cited
UNITED STATES PATENTS

| 3,567,412 | 3/1971 | Lefrancois et al. | 48—202 |
| 3,252,773 | 5/1966 | Solomon et al. | 48—202 |
| 3,252,774 | 5/1966 | McMahon et al. | 48—214 |

JOSEPH SCOVRONEK, Primary Examiner

U.S. Cl. X.R.

23—211; 48—209, 210, 211, 214; 110—8 R; 201—10, 20, 25, 38; 208—8